United States Patent [19]

Sasaki et al.

[11] Patent Number: 4,920,164

[45] Date of Patent: Apr. 24, 1990

[54] EPOXY RESIN COMPOSITION

[75] Inventors: Yukio Sasaki, Roslyn, N.Y.; Takayuki Watanabe, Matsudo, Japan; Hiroshi Takamiya, Kamisu, Japan; Kazuo Watanabe, Osaka, Japan; Yoko Yamazaki, Nagaeyama, Japan

[73] Assignee: Mitsubishi Gas Chemical Company, Inc., Tokyo, Japan

[21] Appl. No.: 221,914

[22] Filed: Jul. 20, 1988

[30] Foreign Application Priority Data

Jul. 20, 1987 [JP] Japan .................................. 62-179184

[51] Int. Cl.$^5$ .............................................. C08L 63/00
[52] U.S. Cl. ...................................... 523/466; 525/396
[58] Field of Search ........................ 525/396; 523/466

[56] References Cited

U.S. PATENT DOCUMENTS

| | | | |
|---|---|---|---|
| 3,475,513 | 10/1969 | Benson et al. | 525/396 |
| 3,631,126 | 12/1971 | Snodgrass et al. | 525/396 |
| 4,567,216 | 1/1986 | Qureshi et al. | 525/396 X |
| 4,608,404 | 8/1986 | Gardner et al. | 525/396 X |

*Primary Examiner*—Earl Nielsen
*Attorney, Agent, or Firm*—Wenderoth, Lind & Ponack

[57] ABSTRACT

An epoxy resin composition consisting essentially of
 (A) an epoxy resin,
 (B) a curing agent,
 (C) a curing promoter,
 (D) a polyphenylene ether resin, and
 (E) a filler.

8 Claims, No Drawings

EPOXY RESIN COMPOSITION

This invention relates to an epoxy resin composition having excellent cracking resistance. More specifically, it relates to an epoxy resin composition containing a polyphenylene ether resin which is suitable for use as an encapsulating material for electronic and electrical component parts.

Epoxy resins have been used extensively in various fields. In particular, most of encapsulating materials for electronic and electrical component parts are composed of epoxy resin compositions, and these resin compositions are important as encapsulating materials for semiconductor elements.

The conventional epoxy resin compositions, however, are not satisfactory in cracking resistance which is required in flat packages for surface mount technology which have recently gained an increasing demand. Specifically, cracking occurs in the soldering treatment of an encapsulating material of an epoxy resin composition in a moisture absorbing condition, and cannot be prevented.

Recently, improved methods were proposed in which an internal stress, one cause of cracking, is reduced by blending an epoxy resin with a reactive silicone or a reactive liquid polybutadiene (see Japanese Laid-Open Patent Publications Nos. 136860/1987, 184517/1985, 94426/1985 and 8315/1985). However, cracking cannot completely be prevented by these methods, and sometimes, swelling occurs in the encapsulated packages.

On the other hand, encapsulating materials produced by blending epoxy resins with thermoplastic polyolefin resins such as polyethylene, polypropylene and polystyrene were proposed with a view to reducing the shrinkage of the epoxy resins during heat curing and improving their moisture resistance (see Japanese Laid-Open Patent Publications Nos. 21125/1986 and 130546/1987). With these encapsulating materials, however, cracking cannot be prevented in the soldering treatment in a moisture absorbing condition.

It is an object of this invention, therefore, to provide an epoxy resin composition having improved cracking resistance.

Another object of this invention is to provide an epoxy resin composition suitable as an encapsulating material for electronic and electrical component parts.

Still another object of this invention is to provide an epoxy resin composition with which cracking occurs very little in the encapsulating of electronic and electrical component parts in a moisture absorbing condition.

Yet another object of this invention is to provide an epoxy resin composition exhibiting very little swelling of a product package in the encapsulation of electronic and electrical component parts.

A further object of this invention is to provide an epoxy resin composition which is industrially valuable as an encapsulating agent.

Other objects of this invention will become apparent from the following disclosure.

According to this invention, the foregoing objects are achieved by an epoxy resin composition consisting essentially of (A) an epoxy resin,
(B) a curing agent,
(C) a curing promoter,
(D) a polyphenylene ether resin, and
(E) a filler.

The epoxy resin composition of this invention will be described below in more detail.

The epoxy resin (A) used in this invention may be any of those which contain at least two epoxy groups per molecule and are used for producing conventional epoxy resin compositions. Novolak-type epoxy resins, bisphenol-type epoxy resins and biphenyl-type epoxy resins are suitable for encapsulating purposes. These epoxy resins may be used singly or in combination.

Specific examples of the novolak-type epoxy resins are phenol novolack epoxy resins, cresol novolak epoxy resins and xylenol novolak epoxy resins. Examples of the bisphenol-type epoxy resins are bisphenol A epoxy resin, bisphenol F epoxy resin and bisphenol S epoxy resin. Examples of the bisphenyl-type epoxy resins are the reaction products of various bishydroxybiphenyl compounds and epihalohydrins such as epichlorohydrin and epibromohydrin, specifically 4,4'-bis(2,3-epoxypropoxy)-biphenyl, 4,4'-bis(2,3-epoxypropoxy)-3,3',5,5'-tetramethylbiphenyl, and 4,4'-bis(2,3-epoxypropoxy)-3,3',5,5'-tetramethyl-2-chlorobiphenyl.

These epoxy resins in which at least one alkyl group or at least one halogen atoms such as bromine or chlorine is substituted in the molecule, particularly in the benzene rings constituting the epoxy resins, may also be used so long as they do not impair the objects of the invention.

The curing agent (B) used in the composition of this invention may be any of those curing agents which are generally used for epoxy resins. It may be, for example, a difunctional or higher compound having functional groups such as amino, acid anhydride, hydroxyl, carboxyl and mercapto groups. Examples are amines, acid anhydrides and phenolic resins. For preparation of encapsulating materials, phenolic resins, particularly novolak-type phenolic resins, are preferred. Their structures and molecular weights are not particularly limited so long as they contain at least two hydroxyl groups per molecule. Specific preferred examples of the novolak-type phenolic resins are phenol novolak, cresol novolak and xylenol novolak. They may be substituted by at least one lower alkyl group or at least one halogen atom such as bromine or chloride in their molecule, particularly in the benzene skeleton.

Desirably, the curing agent (B) is used in such an amount that the ratio of the epoxy group equivalent of the epoxy resin (A to the functional group equivalent of the curing agent (B) is from 0.7/1 to 1.3/1, preferably 0.9/1 to 1.1/1. If the proportion of the curing agent (B) is outside the specified range, the mechanical properties and moisture resistance of shaped articles prepared from the resulting epoxy resin composition will be undesirably deteriorated.

The curing promoter (C) used in the epoxy resin composition of this invention may be any of ordinary curing promoters used for epoxy resins, and may include, for example, imidazoles, organic phosphines, phosphonium salts, amines, cycloamidines and boron complexes. For preparation of encapsulating materials, it is preferred to use the imidazoles (C-1), organic phosphine (C-2), amines (C-3) and cycloamidines (C-4) as the curing promoter. Specific examples of the imidazoles (C-1) include imidazole, 2-methylimidazole, 2-ethyl-4-methylimidazole, 2-phenylimidazole, 2-undecylimidazole, 2-phenyl-4-methyl-5-hydroxymethylimidazole and 1-cyanoethyl-2-phenylimidazole. Specific examples the organic phosphines (C-2) include triphenylphosphine, triethylphosphine, tri-n-propylphosphine, tri-n-butylphosphine, tri-n-hexylphosphine, tri-n-octylphosphine and tris-2-cyanoethylphosphine. Specific examples of the amines (C-3) include triethylamine, ethylenediamine, piperazine, piperidine, morpholine, 2,4,6-tris(dimethylaminomethyl)phenol, m-phenylenediamine and 4,4'-diaminodiphenylmethane. Examples of the cycloamidines (C-4) include 1,5-diazabicyclo[3,4,0]nonene-5, 1,5-diazabicyclo[5,4,0]undecene-7 and 6-dibutylamino-1,8-diazabicyclo[5,4,0]undecene-7.

The preferred amount of the curing promoter (C) to be incorporated is 0.01 to 10 parts by weight, more preferably 0.1 to 5 parts by weight, per 100 parts by weight of the epoxy resin. If the amount of the curing promoter (C) is below the specified lower limit, a sufficient curing speed cannot be obtained. If it is larger than the specified upper limit, the moisture resistance of the resulting composition tends to be deteriorated.

A polymer obtained by oxidative polymerization of an alkylphenol is used as the polyphenylene ether resin (D) in the epoxy resin composition of this invention.

The polyphenylene ether resin (D) may be a homopolymer composed substantially of at least one kind of recurring units of the general formula

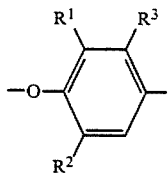

[I]

in which $R^1$, $R^2$, and $R^3$ are identical or different and each represents a hydrogen atom or an alkyl group having 1 to 3 carbon atoms, provided that $R^1$ and $R^2$ are not hydrogen atoms at the same time, or a copolymer composed of two or more kinds of the recurring units of general formula [I].

The polyphenylene ether resin (D) can be produced by oxidatively polymerizing at least one alkylphenol represented by the following general formula

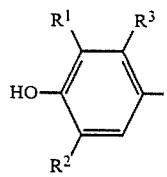

[II]

in which $R^1$, $R^2$ and $R^3$ are as defined with regard to general formula [I].

Many methods for producing the polyphenylene ether resin have been known, and disclosed, for example, in U.S. Pat. Nos. 3306874, 3306875, 3257357, 3257358 and 345588, and Japanese Patent Publications Nos. 27539/1971, 16120/1974 and 17880/1977. The present invention, however, is not limited by the method of producing the polyphenylene ether resin (D).

Specific examples of the polyphenylene ether resin (D) include poly(2,6-dimethyl-1,4-phenylene)ether,
poly(2,6-diethyl-1,4-phenylene)ether,
poly(2,6-dipropyl-1,4-phenylene)ether,
poly(2-methyl-6-ethyl-1,4-phenylene)ether,
poly(2-methyl-6-propyl-1,4-phenylene)ether,
poly(2-ethyl-6-propyl-1,4-phenylene)ether,
2,6-dimethylphenol/2,3,6-trimethylphenol copolymer,
2,6-dimethylphenol/2,3,6-triethylphenol copolymer,
2,6-diethylphenol/2,3,6-trimethylphenol copolymer, and
2,6-dipropylphenol/2,3,6-trimethylphenol copolymer.

The polyphenylene ether resin (D) may be modified at the side chains of terminals so long as the main chain has the above structure. For example, there may be cited modified polyphenylene ether resins obtained by modifying with maleic anhydride, chlorosilane, hydroxyethyl acrylate, etc. and polyphenylene ether resins in which the terminals of the molecular chain are blocked by acetylation or otherwise.

Desirably, the polyphenylene ether resins (D) used in the invention have an intrinsic viscosity, measured in chloroform at 30° C., of 0.2 to 0.7, preferably 0.25 to 0.6.

The amount of the polyphenylene ether resin (D) is preferably 1 to 100 parts by weight, more preferably 3 to 60 parts by weight, per 100 parts by weight of the epoxy resin (A) and the curing agent (B) combined. If the amount of the polyphenylene ether resin (D) is less than 1 part by weight, the desired effect of improving cracking resistance is small and the comosition is of no practical value. If, on the other hand, it exceeds 100 parts by weight, the characteristics of the epoxy resin composition will be lost, and the moldability of the resulting composition will be reduced.

Any commonly known filler having a reinforcing property may be used without particular limitation as the filler (E) in the epoxy resin composition of the invention, and can be selected according to the use and purpose of the final resin composition.

Examples include inorganic fillers such as silica, talc, mica, clay, kaolin, alumina, asbestos, glass balloons, calcium carbonate, aluminum hydroxide, titanium oxide, iron oxide, glass fibers and zinc flower, and organic fillers such as carbon fibers, cured phenolic resin powders and organic fiber. These fillers may be used singly or in combination. For encapsulation purposes, silica is suitably used. Crystalline silica and amorphous silica powders are preferred. The amount of the filler (E) to be incorporate is 50 to 1000 parts by weight, preferably 100 to 500 parts by weight, per 100 parts by weight of the epoxy resin (A), the curing agent (B) and the polyphenylene ether resin (D) combined. If its amount exceeds 1000 parts by weight, the filler is difficult to disperse and moreover, this causes a deterioration in moldability and cracking resistance. The resulting composition is therefore not suitable for practical applications. On the other hand, if its amount is less than 50 parts by weight, there is no significance to using the filler.

The ingredients (A) to (E) may be blended by methods usually known in the art. For example, all the ingredients are mixed by a Nauter mixer, a ribbon mixer or a Henschel mixer, and then melt-kneaded by using a kneader, an extruder or a roll. Alternatively, the ingredients (A), (B) and (D) are first melt-mixed and then the filler (E) and the curing promoter (C) are added and uniformly mixed with the mixture of the ingredients (A), (B) and (D).

Various additives may be added to the composition of this invention according to purposes and uses so long as they do not impair the objects of this invention. The additives include, for example coloring agents such as carbon black, mold releasing agents such as fatty acid esters and carnauba wax, coupling agents such as epoxy-silanes, aminosilanes and alkyl titanates, fire retardants such as antimony compounds, and flexibilizing agents such as reactive silicones, reactive liquid polybutadiene and silicone resin powders.

The epoxy resin composition provided by this invention is suitable as an encapsulating material for electronic and electrical component parts. In the soldering of an elecronic or electrical component part encapsulated with this composition onto a circuit board, cracking of the encapsulating resin due to thermal shock can be prevented. Particularly, cracking of the encapsulating resin occurs frequently when it undergoes thermal shock in a moisture absorbing condition. With the epoxy resin composition of this invention, cracking in a moisture absorbing condition can be prevented. This brings about the advantage of being able to obviate measures against cracking, such as preliminary drying of the encapsulated component part before soldering or storing of the encapsulated part in a moisture-proof condition.

The following Examples and Comparative Examples illustrate the present invention. All parts in these examples are by weight.

In the examples, a cracking resistance test was carried out by the following procedure.

A sample encapsulated with the epoxy resin composition was left to stand for 18 hours in a pressure cooker at 121° C. under 2 atmospheres to permit moisture absorption. Immediately then, it was immersed in a soldering bath at 260° C. for 30 seconds. After withdrawal, the presence or absence of cracks and swelling in the treated sample was observed. Ten samples were tested for each composition.

EXAMPLES 1-3

In each run, cresol/novolak epoxy resin (ESCN 195XL, epoxy equivalent 200; a product of Sumitomo Chemical Co., Ltd.), phenol novolak resin (PSF 4261, hydroxyl equivalent 110; a product of Gunei Chemical Industrial Co., Ltd.), poly(2,6-dimethyl-1,4-phenylene)ether, amorphous silica powder (RD-8, a product of Tatsumori), a silane coupling agent (KBM-403, a product of Shin-etsu Chemical Co., Ltd.), triphenylphosphine (PP-360, a product of Keiai Chemical Co., Ltd.), carnauba wax and carbon black were mixed by a Henschel mixer in the proportions indicated in Table 1, and then kneaded by a roll at 90° to 100° C. The kneaded mixture was cooled and pulverized to form a composition.

A test frame obtained by mounting silcon chips (6.5×6.5 mm) on a 4,2-alloy frame (thickness 0.15 mm) for a 48 pin flat package was encapsulated with the resulting composition by using a transfer molding machine at a mold temperature of 175° C. under a pressure of 70 kg/cm$^2$ for a cure time of 90 seconds. The encapsulated article was after-cured in a constant temperature vessel at 175° C. for 5 hours. The resulting encapsulated article was subjected to the cracking resistance test, and the results are shown in Table 1.

COMPARATIVE EXAMPLES 1-2

The procedure of Examples 1 to 3 was repeated except that as indicated in Table 1, the polyphenylene ether resin (D) was omitted (Comparative Example 1) or an epoxy silicone was incorporated instead of the polyphenylene ether resin (D). The results are shown in Table 1.

TABLE 1

| Blending components | Amounts in parts by weight | | | | |
| --- | --- | --- | --- | --- | --- |
| | Example 1 | Example 2 | Example 3 | Comparative Example 1 | Comparative Example 2 |
| Cresol novolak epoxy (A) | 65 | 65 | 65 | 65 | 65 |
| Cresol novolak (B) | 35 | 35 | 35 | 35 | 35 |
| Polyphenylene ether (D) (*1) | 3 | 10 | 20 | — | — |
| Silica powder (E) | 240 | 267 | 280 | 233 | 257 |
| Silane coupling agent | 1.2 | 1.3 | 1.4 | 1.2 | 1.3 |
| Triphenylphosphine (C) | 1 | 1 | 1 | 1 | 1 |
| Carnauba wax | 1 | 1 | 1 | 1 | 1 |
| Carbon black | 0.7 | 0.7 | 0.7 | 0.7 | 0.7 |
| Epoxy silicone (*2) | — | — | — | — | 10 |
| Cracking resistance test | | | | | |
| Number of cracks formed (*3) | 2 | 0 | 0 | 10 | 7 |
| Number of swellings formed (*4) | 0 | 0 | 0 | 0 | 1 |

(*1) Poly(2,6-dimethyl-1,4-phenylene)ether (intrinsic viscosity measured in chloroform at 30° C., 0.3 dl/g).
(*2) SF-8413 (epoxy equivalent 4000) produced by Toray Silicone Co., Ltd. was used in a form melted and dispersed in the phenol novolak (B).
(*3) Out of ten test samples, the number of those samples in which cracking occurred.
(*4) Out of ten test samples, the number of those samples in which swelling occurred.

EXAMPLES 4-6

In each run, a cresol novolak epoxy resin (EOCN 1020, epoxy equivalent 200; a product of Nippon Kayaku Co., Ltd.), a phenol novolak resin (TD 2131, hydroxyl equivalent 110; a product of Dainippon Ink and Chemicals, Inc.), a brominated bisphenol A epoxy resin (ESB-400, epoxy equivalent 400; a product of Sumitomo Chemical Co., Ltd.), 2,6-dimethylphenol/2,3,6-trimethylphenol copolymer (mole ratio 95/5), antimony trioxide, amorphous silica powder (RD-8, a product of Tatsumori), a silane coupling agent (KBM-403, a product of Shin-etsu Chemical Co., Ltd.), triphenylphosphine (PP-360, a product of Keiai Chemical Co., Ltd.), carnauba wax and carbon black were mixed and kneaded in the proportions shown in Table 2 in the same way as in Examples 1 to 3. Thereafter, the composition was used for encapsulation as in Examples 1 to 3, and the same cracking test was conducted. The results are shown in Table 2.

COMPARATIVE EXAMPLES 3-4

The procedure of Examples 4 to 6 was repeated except that carboxyl-terminated liquid polybutadiene was used instead of the 2,6-dimethylphenol/2,3,6-trimethylphenol copolymer (Comparative Example 3) or a silicone resin powder was added for flexibilization. The results are shown in Table 2.

TABLE 2

| Blending components | Amounts in parts by weight | | | | |
|---|---|---|---|---|---|
| | Example 4 | Example 5 | Example 6 | Comparative Example 3 | Comparative Example 4 |
| Cresol novolak epoxy (A) | 60 | 60 | 60 | 60 | 60 |
| Phenol novolak (B) | 34 | 34 | 34 | 34 | 34 |
| Brominated bisphenol A epoxy (A) | 6 | 6 | 6 | 6 | 6 |
| Antimony trioxide | 5 | 5 | 5 | 5 | 5 |
| Polyphenylene ether (*1) | 5 | 15 | 25 | — | — |
| Silica powder (E) | 245 | 268 | 292 | 268 | 268 |
| Silane coupling agent | 1.2 | 1.3 | 1.5 | 1.3 | 1.2 |
| Triphenylphosphine (C) | 1 | 1 | 1 | 1 | 1 |
| Carnauba wax | 1 | 1 | 1 | 1 | 1 |
| Carbon black | 0.7 | 0.7 | 0.7 | 0.7 | 0.7 |
| Liquid polybutadiene (*2) | — | — | — | 15 | — |
| Silicone resin powder (*3) | — | — | — | — | 15 |
| Cracking resistance test | | | | | |
| Number of cracks formed | 1 | 0 | 0 | 5 | 9 |
| Number of swellings formed | 0 | 0 | 0 | 2 | 0 |

(*1) 2,6-Dimethylphenol/2,3,6-trimethylphenol copolymer (mole ratio 95/5; intrinsic viscosity measured in chloroform at 30° C., 0.45 dl/g).

(*2) HYCAR CTB2600 × 162 (carboxyl-terminated liquid polybutadiene produced by Ube Industries, Ltd.) used in a form melted and dispersed in the epoxy resin.

(*3) Silicone resin powder AY49-290 produced by Toray Silicone Co., Ltd.

EXAMPLE 7

A cresol novolak epoxy resin (ESCN 195XL, epoxy equivalent 200; a product of Sumitomo Chemical Co., Ltd.), a phenol novolak resin (PSF 4261, hydroxyl equivalent 110; a product of Gun Ei Chemical Industry Co., Ltd.), poly(2,6-dimethyl-1,4-phenylene)ether, 4,4'-bis-(2,3-epoxypropoxy)-3,3',5,5'-tetramethylbiphenyl (YX-40000, a product of Yuka Shell Epoxy Co., Ltd.), amorphous silica powder (RD-8, a product of Tatsumori), a silane coupling agent (KBM-403, a product of Shin-etsu Chemical Co., Ltd.), carnauba wax and carbon black were mixed and kneaded in the proportions indicated in Table 3. Thereafter, the composition was used for encapsulation as in Examples 1 to 3, and the same cracking test was conducted. The results are shown in Table 3.

EXAMPLE 8

A cresol novolak epoxy resin (ESCN 195XL, epoxy equivalent 200; a product of Sumitomo Chemical Co., Ltd.), a phenol novolak resin (PSF 4261, hydroxyl equivalent 110; a product of Gun Ei Chemical Industry Co., Ltd.), poly(2,6-dimethyl-1,4-phenylene)ether, an epoxy silicone (KF100T, a product of Shin-etsu Chemical Co., Ltd.), amorphous silica powder (RD-8, a product of Tatsumori), a silane coupling agent (KBM-403, a product of Shin-etsu Chemical Co., Ltd.), 2-phenylimidazole (2PZ, a product of Shikoku Chemicals Corporation), carnauba wax and carbon black were mixed and kneaded in the proportions indicated in Table 3. Thereafter, the composition was used for encapsulation as in Examples 1 to 3, and the same cracking test was conducted. The results are shown in Table 3.

TABLE 3

| Mixing ingredient | Amount (parts) | |
|---|---|---|
| | Example 7 | Example 8 |
| cresol novolak epoxy (A) | 34 | 65 |
| phenol novolak (B) | 36 | 35 |
| bisphenyl epoxy (A) *1 | 30 | — |
| polyphenylene ether (D) *2 | 45 | 5 |
| silica powder (E) | 338 | 257 |
| silane coupling agent | 1.7 | 1.3 |
| 2-phenylimidazole (C) | 0.6 | 1 |
| carnauba wax | 1.5 | 1 |
| carbon black | 1.0 | 0.7 |
| epoxy silicone *3 | — | 5 |
| cracking resistance test | | |
| Number of cracks formed | 0 | 0 |
| Number of swellings formed | 0 | 0 |

*1: YX-4000 produced by Yuka Shell Epoxy Co., Ltd.

*2: Poly(2,6-dimethyl-1,4-phenylene)ether having an intrinsic viscosity, measured in chloroform at 30° C., of 0.56 dl/g.

*3: KF100T (epoxy equivalent 4000) produced by Shin-etsu Chemical Co., Ltd.: added in a form melted and dispersed in the phenol novolak.

COMPARATIVE EXAMPLES 5-7

Example 2 was repeated except that polyethylene (Yukalon LK50, a product of Mitsubishi Petrochemical Co., Ltd.), polypropylene ("Mitsui Petrochemical Polypro Hipol J300", product of Mitsui Petrochemical Industries, Ltd.) or polystyrene (Diarex HH102, a product of Mitsubishi Monsanto Co., Ltd.) was used instead of the polyphenylene ether resin. The results are shown in Table 4.

TABLE 4

| Comparative Example | 5 | 6 | 7 |
|---|---|---|---|
| Cresol novolak epoxy | 65 | 65 | 65 |
| Phenol novolak | 35 | 35 | 35 |
| Silica powder | 257 | 257 | 257 |
| Silane-coupling agent | 1.3 | 1.3 | 1.3 |
| Triphenylphosphine | 1 | 1 | 1 |
| Carnauba wax | 1 | 1 | 1 |
| Carbon black | 0.7 | 0.7 | 0.7 |
| Polyethylene | 1.0 | — | — |
| Polypropylene | — | 10 | — |
| Polystyrene | — | — | 10 |
| Cracking resistance test (number of cracks formed) | 10 | 10 | 8 |

We claim:

1. An epoxy resin composition consisting essentially of
   (A) an epoxy resin,
   (B) a curing agent,
   (C) 0.01 to 10 parts by weight of a curing promoter per 100 parts by weight of the epoxy resin (A),
   (D) 1 to 100 parts by weight of a polyphenylene ether resin per 100 parts by weight of the epoxy resin (A)

and the curing agent (B) combined, said polyphenylene ether resin being a homopolymer or copolymer composed essentially of at least one kind of recurring units of the formula

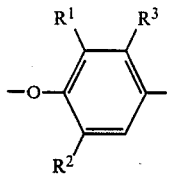

in which $R^1$, $R^2$ and $R^3$ are identical or different and each represents hydrogen or alkyl having 1 to 3 carbon atoms, provided that $R^1$ and $R^2$ are not hydrogen at the same time, and (E) 50 to 1,000 parts by weight of a silica powder per 100 parts by weight of the epoxy resin (A), the curing agent (B) and the polyphenylene ether resin (D) combined, said filler being at least one silica selected from the group consisting of crystalline silica and amorphous silica.

2. The resin composition of claim 1 in which the epoxy resin (A) is an epoxy resin containing at least two epoxy groups per molecule.

3. The resin composition of claim 1 in which the epoxy resin (A) is at least one epoxy resin selected from the group consisting of novolak-type epoxy resins, bisphenol-type epoxy resins and biphenyl-type epoxy resins.

4. The resin composition of claim 1 in which the curing agent (B) is a novolak-type phenolic resin having at least two hydroxyl groups per molecule.

5. The resin composition of claim 1 in which the curing promoter (C) is at least one compound selected from the group consisting of (1) imidazoles, (2) organic phosphines, (3) amines and (4) cycloamidines.

6. An electronic or electrical component part encapsulated by the resin composition of claim 1.

7. The resin composition of claim 1 in which the amount of the silica powder (E) is 100 to 500 parts by weight per 100 parts by weight of the epoxy resin (A), the curing agent (B) and the polyphenylene ether resin (D) combined.

8. The resin composition of claim 1 in which the curing agent (B) is contained in such an amount that the ratio of the epoxy group equivalent of the epoxy resin (A) to the functional group equivalent of the curing agent (B) is in the range of 0.7:1 to 1.3:1.

* * * * *